United States Patent
Weh et al.

(10) Patent No.: US 12,024,141 B2
(45) Date of Patent: Jul. 2, 2024

(54) PUMP ASSEMBLY, IN PARTICULAR FOR GENERATING PRESSURE IN A BRAKE CIRCUIT OF A CONTROLLABLE POWER BRAKE SYSTEM OF A MOTOR VEHICLE

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/046,389

(22) Filed: Oct. 13, 2022

(65) Prior Publication Data
US 2023/0166706 A1 Jun. 1, 2023

(30) Foreign Application Priority Data
Nov. 26, 2021 (DE) .................. 10 2021 213 326

(51) Int. Cl.
| | | |
|---|---|---|
| *B60T 13/74* | (2006.01) |
| *F16D 125/06* | (2012.01) |
| *F16D 125/40* | (2012.01) |
| *F16J 1/04* | (2006.01) |
| *F16J 1/06* | (2006.01) |
| *F16J 1/12* | (2006.01) |

(52) U.S. Cl.
CPC ........ *B60T 13/745* (2013.01); *F16D 2125/06* (2013.01); *F16D 2125/40* (2013.01); *F16J 1/04* (2013.01); *F16J 1/06* (2013.01); *F16J 1/12* (2013.01)

(58) Field of Classification Search
CPC ..... B60T 13/745; F16J 1/04; F16J 1/06; F16J 1/12; F16D 2125/06; F16D 2125/40
See application file for complete search history.

(56) References Cited

U.S. PATENT DOCUMENTS

| | | | | |
|---|---|---|---|---|
| 5,105,917 A | * | 4/1992 | Sporzynski | ............ B21D 53/34 |
| | | | | 92/172 |
| 6,637,317 B1 | * | 10/2003 | Zeibig | ..................... B23P 15/10 |
| | | | | 92/208 |
| 10,144,400 B2 | * | 12/2018 | Weh | ......................... F04B 17/03 |
| 10,337,575 B2 | * | 7/2019 | Lee | ........................... F16D 65/66 |
| 10,364,890 B2 | * | 7/2019 | Winkler | ................... F16J 1/001 |
| 10,919,510 B2 | * | 2/2021 | Alili | ...................... B60T 13/745 |

(Continued)

FOREIGN PATENT DOCUMENTS

| | | |
|---|---|---|
| DE | 112018005606 A5 | 7/2020 |
| WO | 2019/076548 A1 | 4/2019 |

*Primary Examiner* — Dustin T Nguyen
(74) *Attorney, Agent, or Firm* — NORTON ROSE FULBRIGHT US LLP; Gerard A. Messina

(57) ABSTRACT

A pump assembly for generating pressure in a brake circuit of a controllable power brake system of a motor vehicle. The pump assembly has, as a pressure generator, a piston-cylinder unit in which a piston is actuated with the aid of a piston drive. The piston drive converts a rotational movement, with which a nut of this piston drive is driven, into a translatory movement of a spindle, which is in turn connected to the piston in a rotationally fixed manner. The piston is a steel component in which a plastic deformation at a piston head forms a device for connecting the spindle to the piston in a rotationally fixed manner.

13 Claims, 3 Drawing Sheets

(56) References Cited

U.S. PATENT DOCUMENTS

| | | | |
|---|---|---|---|
| 11,318,921 B2* | 5/2022 | Weh | F04B 53/16 |
| 2020/0256413 A1* | 8/2020 | Winkler | F16D 65/18 |
| 2022/0388488 A1* | 12/2022 | Greiner | F16H 25/20 |

* cited by examiner

PUMP ASSEMBLY, IN PARTICULAR FOR GENERATING PRESSURE IN A BRAKE CIRCUIT OF A CONTROLLABLE POWER BRAKE SYSTEM OF A MOTOR VEHICLE

CROSS REFERENCE

The present application claims the benefit under 35 U.S.C. § 119 of German Patent Application No. DE 10 2021 213 326.6 filed on Nov. 26, 2021, which is expressly incorporated herein by reference in its entirety.

The present invention relates to a pump assembly, in particular for generating pressure in a brake circuit of a controllable power brake system of a motor vehicle.

BACKGROUND INFORMATION

With regard to controllable brake systems of motor vehicles, there is a distinction to be made between manual brake systems and power brake systems.

While, in manual brake systems, the driver uses muscular force to build up a brake pressure in a brake circuit, in power brake systems, this driver merely indicates a braking request by actuating an actuating device, usually a brake pedal or a brake lever. This braking request is detected by a sensor system, which, for this purpose, measures, for example, an actuating travel of the actuating device, an actuating force or a pressure generated by the actuating device and converts this measurement into a corresponding electrical signal. This signal is transferred to an electronic control unit, where it is converted into a control signal with which an electric motor is controlled. The electric motor drives a pressure generator, which displaces pressure medium into the brake circuit and thereby establishes a brake pressure which is proportional to the braking request.

In power brake systems, there is no longer a coupling between the driver and the brake circuit or the wheel brakes connected thereto, and changes in pressure, such as occur as part of the pressure control, for example, or pressure pulsations, which may arise due to the generation of pressure, may consequently go unnoticed by the driver and his passengers. Power brake systems are therefore notable for increasing the driving and braking comfort.

Moreover, power brake systems also allow automatic braking procedures, i.e., the execution of braking procedures without intervention by a driver and therefore also without the presence of a braking request. Such braking procedures are triggered and controlled, for example, as a function of the driving stability of the vehicle and/or the traffic conditions in the surrounding environment of the vehicle. To this end, the vehicle is equipped with sensor devices and signal evaluating devices. Power brake systems therefore also contribute to increasing the safety in road traffic and, in addition, provide the basis for possible implementation of automated motor-vehicle operation in the future.

A pump assembly, such as that on which the present invention is based, forms a core component of a power brake system. Such a pump assembly is described, for example, in German Patent Application No. DE 11 2018 005 606 A1. FIG. 1 of the present document shows the conventional pump assembly.

This pump assembly (10) has a piston-cylinder unit (12) for delivering pressure medium or for building up brake pressure in at least one connected brake circuit. This piston-cylinder unit comprises a piston (14), which is movably received in a cylinder (16) and delimits a working chamber (20) supplied with pressure medium from a reservoir (18).

The piston (14) can be actuated by a piston drive (22) and executes an appropriate reciprocating translatory movement in the cylinder (16), i.e. an axial movement in the pressure build-up or pressure decrease direction. In the case of a pressure build-up, the driven piston reduces a volume of the working chamber (20) and thereby displaces the pressure medium out of the working chamber (20) and into the brake circuit(s) connected to the pump assembly (10).

In the pump assembly (10) illustrated in FIG. 1, a planetary gearing (26) is provided between an electric motor (24) for driving the piston drive (22) and the actual piston drive (22). A plurality of planet gears (28) of this planetary gearing (26) are each mounted at a respective associated bearing point on a common planet carrier (30), this planet carrier (30) in turn being fixed to an end face of a nut (32) of the piston drive (22), which end face faces the electric motor (24). The external teeth of the planet gears (28) mesh with internal teeth of a ring gear (34) and with external teeth of a sun gear (36) of the planetary gearing (26). The sun gear (36) is driven by the electric motor (24) and thereby forces the planet gears (28) into a rotational movement. This is transferred to the nuts (32) of the piston drive (22) via the planet carrier (30).

In the example shown, the nuts (32) cooperate directly with a spindle (38) to convert this rotational movement into a translatory movement. To this end, teeth on the inside of the nut (32) mesh with external teeth on the circumference of the spindle (38). Alternatively, indirect actuation of the spindle (38) by the nuts (32) may also be realized by balls rotating in ball races which are formed partly on the inside of the nut (32) and partly on the circumference of the spindle (38).

A rotationally fixed connection is established between the spindle (38) and the piston (14). To this end, the spindle (38) has, at one of its ends, a pin-shaped extension (40), which is pressed into an associated receptacle (42) on the inside of a head of the piston (14). For a reliable force fit between the components, the extension (40) is provided with a surface profile, for example a knurl, on its circumference.

The piston in turn has guide means (44), which are arranged on its circumference and via which it is supported in the circumferential direction in second guide means (46) on the housing and therefore guided in a manner which is secured against twisting. As a result, the forced rotational movement of the nuts (32) is converted by the piston drive (22) into a translatory movement of the spindle (38) or the piston (14) coupled to the spindle (38) in a rotationally fixed manner.

The known pump assembly (10) uses a piston (14) made of aluminum, which may be produced, for example, using a casting technique and by subsequent machining. However, such an aluminum piston is disadvantageous due to its extensive cross-sectional dimensions, with a negative influence on the possible dimensioning of the components of the piston drive and consequences relating to its performance data and operating properties. In this regard, concentricity deviations between the piston (14), the piston drive (22) and the cylinder (16) are particularly unwelcome, since they may cause leaks or wear. To counteract this, the guidance of an aluminum piston in the cylinder (16) is subject to high, and therefore cost-driving, quality requirements, which include, for example, finishing the piston running surface by grinding. In addition, to protect against wear, it is necessary to provide the aluminum piston with a suitable surface coating. Aluminum pistons are therefore expensive to produce.

SUMMARY

The present invention is advantageous in that the piston can be produced more cost-effectively than an aluminum piston and requires less installation space owing to its smaller material cross section. Therefore, more space is available in the interior of the piston to accommodate a piston drive, which in turn enables the individual parts of this piston drive to be dimensioned in a manner better adapted to the demands of the particular application. According to the present invention, the piston is now designed as a steel component and is therefore significantly more wear-resistant than pistons made of aluminum. It is thus possible to dispense with a wear-resistant coating of the piston.

Furthermore, steel pistons can be produced relatively easily and with a very good surface quality using a forming technique, so that, in addition, it is possible to dispense with complex finishing of the piston running surface. With the aid of a deformation at the piston head of the piston, it is also possible to realize non-cutting production of a device by which the piston is to be connected to the spindle of a piston drive in a reliably axially-fixed manner over its lifetime. This device is notable for a small spatial requirement in the interior of the piston.

Further advantages or advantageous developments of the present invention are disclosed herein.

According to an example embodiment of the present invention, the device for axially fixing the spindle to the piston is advantageously designed as a cup-shaped receptacle, which is open towards the interior of the piston and whereof the wall is formed by two mutually abutting material layers of the piston head, which are connected to one another in the interior of the piston head.

Furthermore, in a piston according to an example embodiment of the present invention, a first guide means (i.e., a first guide element) can also be produced using a forming technique, namely by bending a material extension which is formed in one piece with the piston skirt.

A piston according to an example embodiment of the present invention may thus have an at least substantially constant wall thickness throughout and therefore behaves more robustly than an aluminum piston under temperature, pressure or a dynamic load.

BRIEF DESCRIPTION OF THE DRAWINGS

An exemplary embodiment of the present invention is illustrated with the aid of the figures and will be explained in detail in the description below.

The figures comprise a total of 4 figures, in which mutually corresponding components are denoted by the same reference signs.

DETAILED DESCRIPTION OF EXAMPLE EMBODIMENTS

Figure 1:
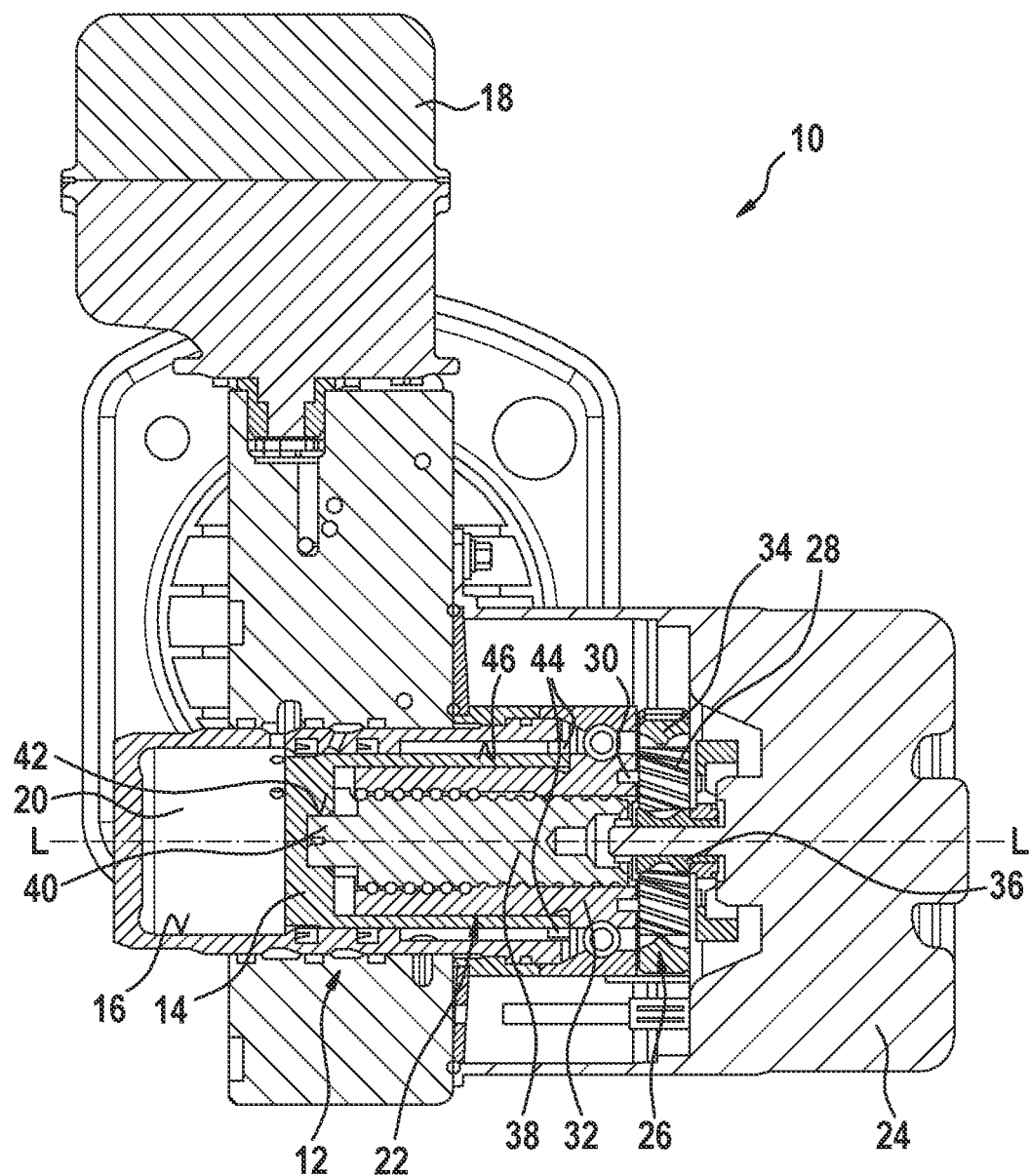
FIG. 1 shows, in a longitudinal section, a pump assembly which is conventional in the related prior art and acknowledged above.

The pump assembly (10) illustrated in FIG. 1 belongs to the related art and has already been explained in detail above. As stated, it comprises a piston-cylinder unit (12) having a piston (14), which is received in a cylinder (16) and which can be driven for reciprocating translatory movement by an electric motor (24) via an interconnected planetary gearing (26) and a piston drive (22) arranged downstream. The following description discusses the structural design of this piston (14), which enables this piston to be produced from steel in a cost-effective and space-saving manner using a forming technique and without machining.

Figure 2:
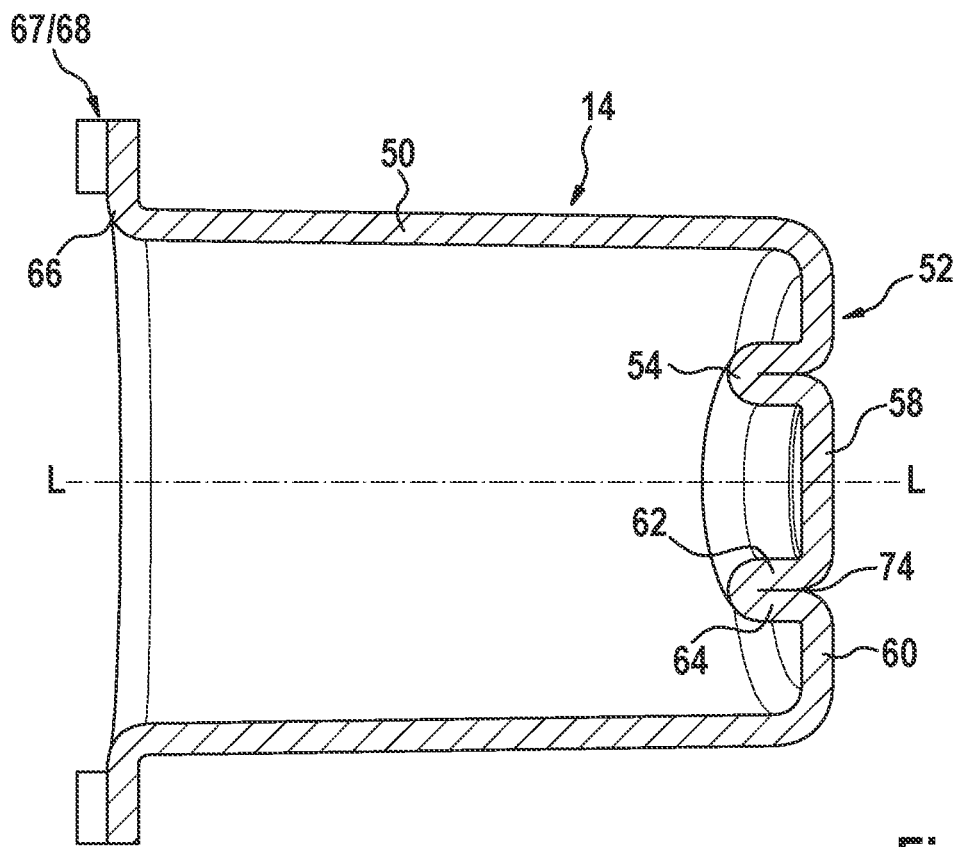
FIG. 2 shows a piston of s pump assembly in a longitudinal section, according to an example embodiment of the present invention.

According to FIG. 2, the piston (14) designed according to the an example embodiment of the present invention is a hollow piston which is open at one end. It is preferably produced from steel by deep drawing and is divided into a cylindrical piston skirt (50) and a closed piston head (52), which is integrally connected to this piston skirt (50) at one end thereof. The wall thickness of the piston (14) is at least substantially constant throughout, i.e. in the region of the piston skirt (50) and the piston head (52); transitions, such as those between the piston skirt (50) and the piston head (52), for example, are rounded.

Figure 3:
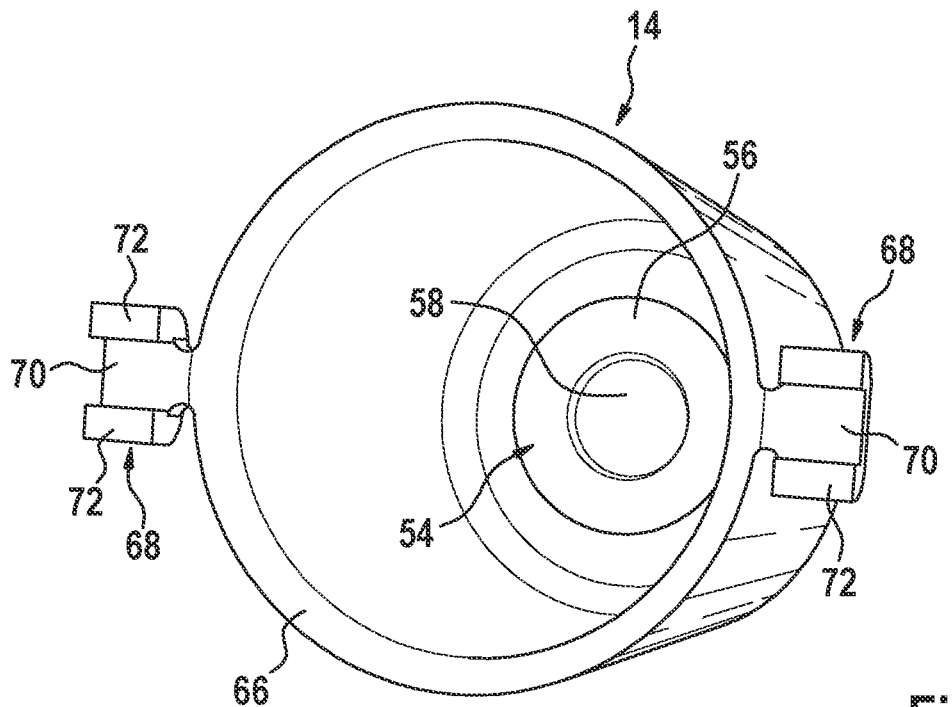
FIG. 3 shows a view into the hollow interior of the piston.

A deformation (54) is provided at the piston head (52), which deformation creates a device by which the piston (14) is to be connected to a spindle (38) of the piston drive (22) in an axially fixed manner. This deformation (54) is a double folding of the material of the piston head (52). This folding forms a circular cup, which is arranged concentrically to a longitudinal axis L of the piston (14) at the piston head (52) and projects into the interior of the hollow piston (14). The circumferential wall (56) of the deformation (54) can be seen in a plan view through the open end of the piston (14) (FIG. 3). This wall (56) encloses a base area (58) which, by way of example, is of planar design and is depressed with respect to the wall (56). On the outside of the piston (14), this base area (58) is flush with a remaining ring area (60) of the piston head (52), which surrounds the deformation (54) at its circumference. The remaining ring area (60) and the base area (58) together define the end face of the piston head (52) which is to be acted upon by a pressure medium.

As a result of the folding, the wall (56) of the deformation (54) consists of a first material layer (62) of the piston head (52), which is turned inwards at a right angle, and a second material layer (64) of the piston head (52), which is turned in the opposite direction to the first material layer. Both material layers (62; 64) abut against one another and are connected to one another at their ends which are situated in the interior of the piston (14). Between them, they delimit a narrow gap (74), which is open towards the surrounding environment of the piston (14). The material layers (62; 64) of the wall (56) extend circumferentially such that they are approximately concentric to one another and concentric to the circumferential surface of the piston skirt (50).

The open end of the piston (14) widens into a circumferential lip (66), which protrudes with respect to a circumference of the piston skirt (50). Material extensions (67) of this lip (66) form a plurality of first guide means (68), which protrude radially from the piston (14) as a result of bending the material extensions (67) at a right angle. The guide means (68) comprise a base (70), which is connected to the lip (66) in one piece and whereof the side edges are bent to form wings. These wings (72) are situated at a distance opposite one another in a plane-parallel manner and extend in the direction of the longitudinal axis L of the piston (14). In the exemplary embodiment, the wings (72) extend, for example, in a direction which points away from the piston head (52), although this is not compulsory for the invention. The wings (72) might likewise extend in the direction of the piston head (52). The first guide means (68) are provided for mounting so-called sliding blocks, made of plastic, on the piston (14). The piston (14) is received and radially supported in the second guide means (46) on the assembly via these sliding blocks, with little friction and noise. The sliding blocks in turn abut circumferentially against the wings (72) of the first guide means (68).

Further details relating to the configuration of the first guide means (68) can be seen in FIG. 3. Accordingly, by way of example, precisely two first guide means (68) are provided on the piston, which are arranged in a diametrically opposed manner on the circumference of the piston (14).

The wings (72) of a wing pair of the guide means (68) are connected to one another and to the lip (66) of the piston (14) via the common base (70). In a plan view, the guide means (68) have a u-shaped cross section, whereof the opening points away from the piston head (52) owing to the exemplary direction of extent of the wings (72).

Figure 4:
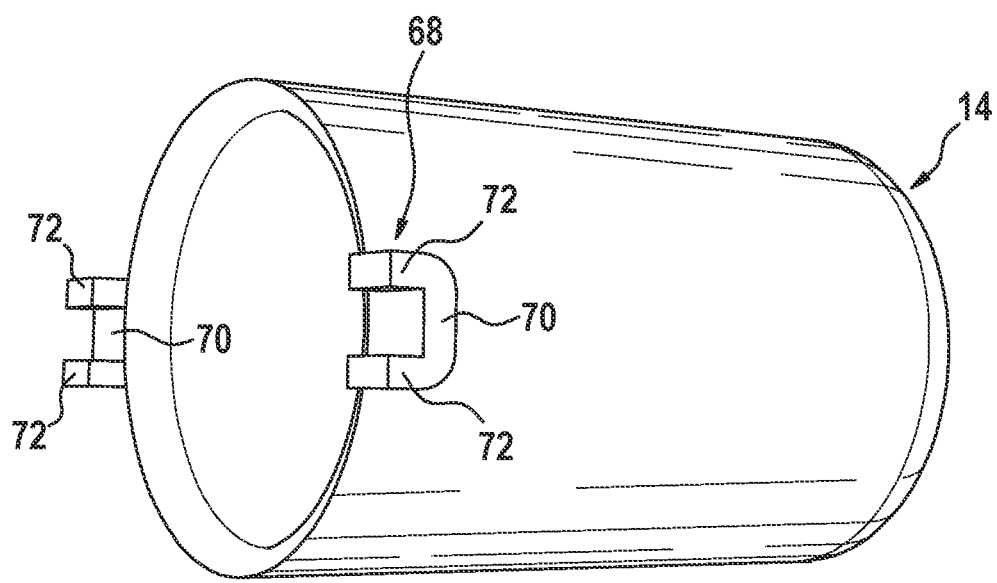
FIG. 4 shows a piston according to an example embodiment of the present invention, in a perspective illustration looking obliquely onto its open end from the rear.

To illustrate the previously explained configuration of the piston, FIG. 4 shows this piston again in a view looking obliquely onto the open end from the rear.

As mentioned, the explained steel piston can be produced in a deep drawing process and, theoretically, with a very good surface quality, However, with this production procedure, grooves may still occur in the circumferential surface of the piston skirt, which grooves extend in the longitudinal direction L of the piston (14) and therefore hinder the subsequent sealing of the piston (14) in the cylinder (16). It is possible to eliminate such grooves with little additional effort by post-treating, in particular, the circumferential or running surface of the piston (14) by compressed air blasting with a solid blasting medium after the deep drawing procedure. Such blasting methods are conventional.

Modifications or additions to the exemplary embodiment which go beyond the explanations above are possible without deviating from the scope of the present invention.

What is claimed is:

1. A pump assembly for generating pressure in a brake circuit of a controllable power brake system of a motor vehicle, the pump assembly comprising:
    a piston-cylinder unit including:
        a hollow steel piston; and
        a cylinder in which the piston is displaceably received and that delimits a working chamber;
    a piston drive that is configured to drive the piston and that includes:
        a nut configured to be driven for rotational movement; and
        a spindle that executes a translatory movement, cooperates at least indirectly with the nut, and is connected to the piston in a rotationally fixed manner; and
    at least one first guide element;
    wherein:
        the piston has:
            a piston skirt that is open at one axial end of the piston and that has a radially outwardly extending circumferential lip having an exterior circumferential edge, which, in at least one circumferential region of the piston, is an axial and radial terminating edge of the piston; and
            a piston head having a plastic deformation forming a device by which the spindle is connected to the piston in a rotationally fixed manner; and
        each of the at least one first guide element:
            is positioned at a respective distinct circumferential position of the lip in a respective other circumferential region of the piston;
            extends radially outward from the lip at a radial position of the lip that is radially the same as a radially outermost position to which the lip extends in the at least one circumferential region of the piston, so that an entirety of the respective first guide element is radially exterior to all of the lip; and
            is integrally formed with the exterior circumferential edge of the lip.

2. The pump assembly as recited in claim 1, wherein the plastic deformation forms a cup-shaped receptacle, which is open towards an interior of the piston and a wall of the deformation is formed by an inwardly bent first and second material layer of the piston head.

3. The pump assembly as recited in claim 2, wherein the first and second material layers of the wall are connected to one another at an end situated in an interior of the piston and, enclose a gap between the first and second material layers, the gap being open towards a surrounding environment of the piston.

4. The pump assembly as recited in claim 3, wherein the plastic deformation forms a circumferential channel that is radially exterior to, surrounds, and is separated by the first and second material layers from, the cup-shaped receptacle.

5. The pump assembly as recited in claim 4, wherein:
    the channel and the cup-shaped receptacle each forms:
        a respective interior surface of the piston that is perpendicular to a central longitudinal axis that extends axially and about which the nut rotates and that faces towards the open axial end of the piston skirt; and
        a respective exterior surface of the piston that is perpendicular to the central longitudinal axis and that faces away from the open axial end of the piston skirt;
    the respective interior surfaces of the channel and the cup-shaped receptacle are at a same axial position of the piston as each other; and
    the respective exterior surfaces of the channel and the cup-shaped receptacle are at a same axial position of the piston as each other.

6. The pump assembly as recited in claim 1, wherein the plastic deformation has an inside diameter which is matched to an end of the spindle in such a way that, between the spindle and piston, a force fit is established via which the spindle is to be connected to the piston in a rotationally fixed manner.

7. The pump assembly as recited in claim 1, wherein each of the at least one first guide element is formed by deformation of a material extension which is integrally formed with the lip of the piston skirt.

8. The pump assembly as recited in claim 7, wherein the piston is radially supported against a second guide element on the pump assembly via the at least one first guide element.

9. The pump assembly as recited in claim 1, wherein each of the at least one first guide element includes a radially extending base surface and at least one wall extending axially from the base surface in a direction parallel to a central longitudinal axis about which the nut rotates.

10. The pump assembly as recited in claim 1, wherein each of the at least one first guide element includes a base surface and two walls (a) between which the base surface extends radially outward from the exterior circumferential edge and (b) that extend axially from the base surface in a direction parallel to a central longitudinal axis about which the nut rotates.

11. The pump assembly as recited in claim 10, wherein each of the two walls includes a respective first end connected to the base surface and a respective second end, which is a free end pointing in a direction away from the piston head.

12. The pump assembly as recited in claim 10, wherein the two walls and the base surface between the two walls form a u-shape whose base is at the open axial end of the piston skirt.

13. The pump assembly as recited in claim 10, wherein the two walls include respective interior surfaces that face each other and extend in respective planes that are parallel to each other.

* * * * *